(12) United States Patent
Leo et al.

(10) Patent No.: US 10,639,908 B2
(45) Date of Patent: May 5, 2020

(54) SYSTEM AND METHOD FOR PRODUCING AN IMAGE ON AN ARTICLE

(71) Applicant: Xerox Corporation, Norwalk, CT (US)

(72) Inventors: Michael F. Leo, Penfield, NY (US); Brendan C. Casey, Webster, NY (US); Wayne A. Buchar, Bloomfield, NY (US); Daniel J. McVeigh, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/945,367

(22) Filed: Apr. 4, 2018

(65) Prior Publication Data

US 2019/0092042 A1    Mar. 28, 2019

Related U.S. Application Data

(60) Provisional application No. 62/562,116, filed on Sep. 22, 2017.

(51) Int. Cl.
*B41J 3/407* (2006.01)
*B41J 11/00* (2006.01)
(Continued)

(52) U.S. Cl.
CPC ............... *B41J 3/4073* (2013.01); *B41J 2/15* (2013.01); *B41J 11/002* (2013.01);
(Continued)

(58) Field of Classification Search
CPC .... B41J 3/4073; B41J 11/002; B41M 5/0047; B41M 5/0088
See application file for complete search history.

(56) References Cited

U.S. PATENT DOCUMENTS

| 4,392,565 A * | 7/1983 | Strauch | B41F 17/22 |
| | | | 101/38.1 |
| 9,375,927 B1 * | 6/2016 | Perego | B41J 3/4073 |
| (Continued) | | | |

FOREIGN PATENT DOCUMENTS

| EP | 2591917 | 5/2013 |
| WO | 2004/016438 | 2/2004 |

OTHER PUBLICATIONS

U.S. Appl. No. 15/591,263, filed May 10, 2017 (unpublished).
(Continued)

*Primary Examiner* — Alessandro V Amari
*Assistant Examiner* — Kendrick X Liu
(74) *Attorney, Agent, or Firm* — Maginot Moore & Beck LLP

(57) ABSTRACT

A system for printing images on an object, the system including, a housing, a rod driven by a first motor, an object rotating subsystem positioned about the rod and arranged for reciprocal movement, an object rotating subsystem that includes a spindle and a second motor connected to the spindle and configured to rotate the object in a first rotational direction or a second rotational direction. The system further including a vacuum source connected to the spindle, a plurality of printheads, a curing lamp, and a controller connected to the plurality of printheads, the first motor, the second motor, the curing lamp, the controller configured to operate the first motor, the second motor, the plurality of printheads, and the curing lamp, wherein the plurality of printheads are configured to eject a first marking material onto the object and the second motor rotates the object in the first or second rotational direction.

16 Claims, 19 Drawing Sheets

(51) Int. Cl.
- *B41M 5/00* (2006.01)
- *B41J 29/38* (2006.01)
- *H04N 1/00* (2006.01)
- *H04N 1/387* (2006.01)
- *B41J 2/15* (2006.01)
- *B41J 29/02* (2006.01)

(52) U.S. Cl.
CPC ........... *B41J 11/0095* (2013.01); *B41J 29/02* (2013.01); *B41J 29/38* (2013.01); *B41M 5/0047* (2013.01); *B41M 5/0088* (2013.01); *H04N 1/0019* (2013.01); *H04N 1/3876* (2013.01)

(56) References Cited

U.S. PATENT DOCUMENTS

| | | | |
|---|---|---|---|
| 2012/0098914 A1* | 4/2012 | Dubuit | B41J 3/4073 347/104 |
| 2012/0274695 A1* | 11/2012 | LaCaze | B41J 2/1752 347/16 |
| 2015/0138295 A1* | 5/2015 | Lindner | B41J 3/4073 347/110 |

OTHER PUBLICATIONS

U.S. Appl. No. 15/674,764, filed Aug. 11, 2017 (unpublished).
Brochure. "Pail & Bucket Printers, printing systems for the container and closure industries", DESCO a division of apex machine company, Twinsburg, Ohio, www.descomachine.com, last accessed Jun. 28, 2018.

* cited by examiner

SYSTEM AND METHOD FOR PRODUCING AN IMAGE ON AN ARTICLE

CROSS-REFERENCE TO RELATED APPLICATIONS

This patent application claims the benefit under 35 U.S.C. § 119(e) of U.S. Provisional Patent Application No. 62/562,116, filed Sep. 22, 2017, which application is incorporated herein by reference.

TECHNICAL FIELD

The presently disclosed embodiments are directed to providing a printing system for direct to three-dimensional (3D) object printing, and more particularly, to a system for printing directly on objects that are frustoconical in shape, e.g., to a system for printing images on a bucket.

BACKGROUND

Commercial article printing typically occurs during the production of the article. For example, ball skins are printed with patterns or logos prior to the ball being completed and inflated. Consequently, a non-production establishment, such as a distribution site, which customizes products, for example, in regions in which potential product customers support multiple professional or collegiate teams, need to keep an inventory of products bearing the logos of various teams followed in that area. Ordering the correct number of products for each different logo to maintain sufficient inventory can be problematic and expensive.

One way to address these issues in non-production outlets would be to keep unprinted versions of the products and print the patterns or logos on them at the distribution site, i.e., on-demand. Printers known as direct-to-object (DTO) printers have been developed for printing on individual objects. However, these DTO printers typically employ printing techniques similar to two-dimensional (2D) flatbed printers, i.e., printheads that traverse the width of a print media close to the surface of the print media. Due to the proximity of the traversing printheads, these printers are limited to printing on surfaces that are relatively flat, i.e., with no protrusions. Therefore, adapting known printing techniques, such as 2D media printing technology, to apply image content onto three-dimensional objects with non-uniform surfaces is difficult. The difficulties are especially compounded when the objects are non-uniform in diameter, or contain large protrusions, e.g., the satellite rings or lip for attaching a lid on a bucket.

Thus, a DTO printer to print on three-dimensional, e.g., frustoconical objects, having a non-uniform surface is needed. The present disclosure addresses a system and method printing high quality images on three-dimensional objects, e.g., on a frustoconical surface such as a bucket, such that image integrity is maintained.

SUMMARY

According to aspects illustrated herein, there is provided a system for printing images on an object, the system including, a housing, a rod driven by a first motor, an object rotating subsystem positioned about the rod and arranged for reciprocal movement, the object rotating subsystem includes a spindle and a second motor connected to the spindle and configured to rotate the object in a first rotational direction or a second rotational direction, opposite the first rotational direction. The system further including a vacuum source connected to the spindle, a plurality of printheads, a curing lamp, and a controller operatively connected to the plurality of printheads, the first motor, the second motor, and the curing lamp. The controller is configured to operate the first motor, the second motor, the plurality of printheads, and the curing lamp, wherein the plurality of printheads are configured to eject a first marking material onto the object and the second motor rotates the object in the first or second rotational direction.

According to other aspects illustrated herein, there is provided a method of printing an image onto an object including the steps of creating a negative pressure with a vacuum source operatively connected to a spindle; securing the object to a carrier, operatively arranged to rotate in a first rotational direction and a second rotational direction opposite the first rotational direction; rotating the object with a first motor in the first rotational direction a first rotational distance; sensing with at least one optical sensor a location of a first protrusion on an external surface of the object while the object is rotating; stopping the rotation of the object in the first rotational direction; rotating the object with the first motor in the second direction a second rotational distance, the second rotational distance is based on the location of the first protrusion; displacing a printhead carrier with a second motor to a first position determined by the location of the first protrusion; and printing an image onto the external surface of the object with a plurality of printheads arranged on the printhead carrier.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
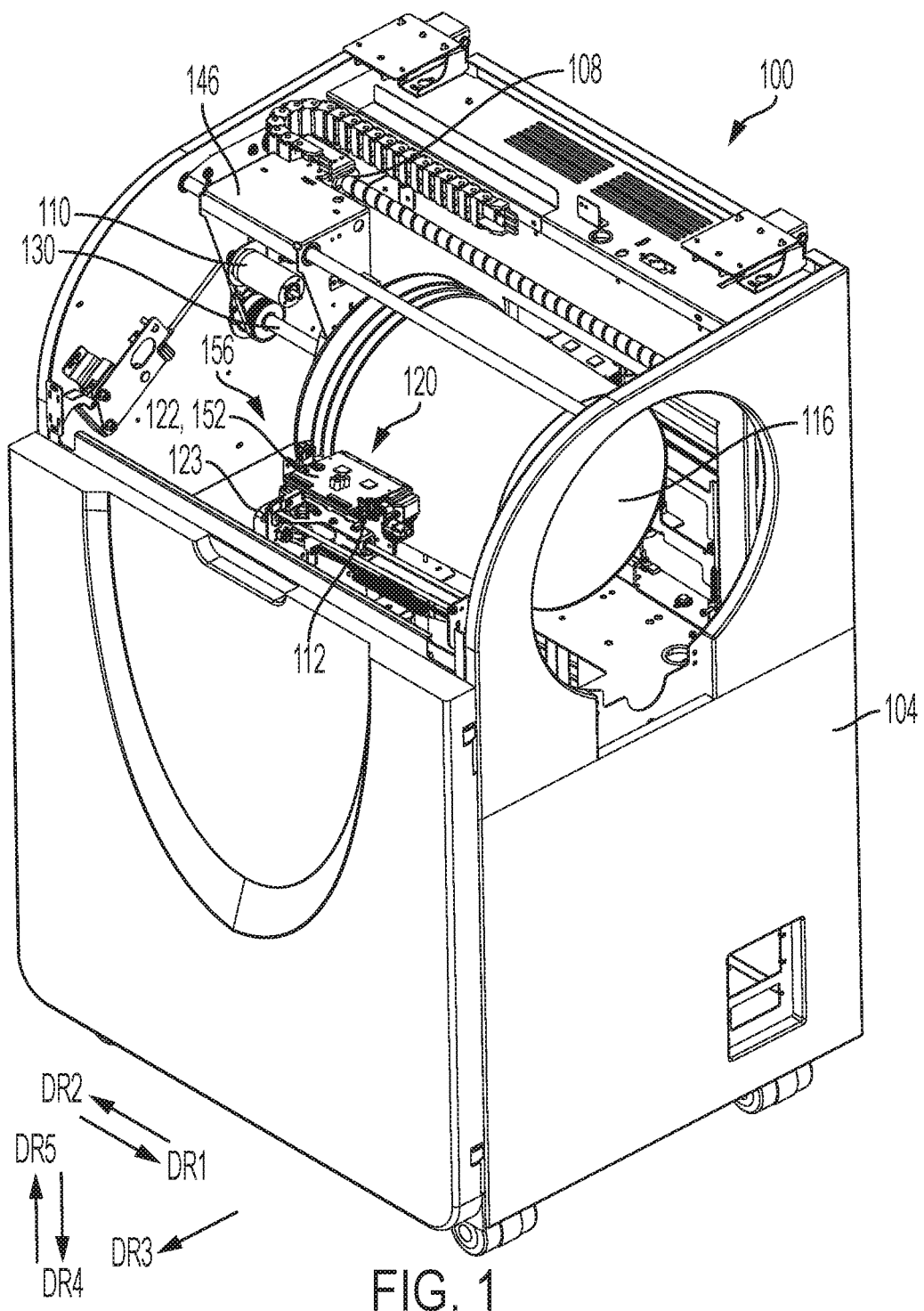
FIG. 1 is a front perspective view of an embodiment of a printer system disclosed herein.
Figure 2:
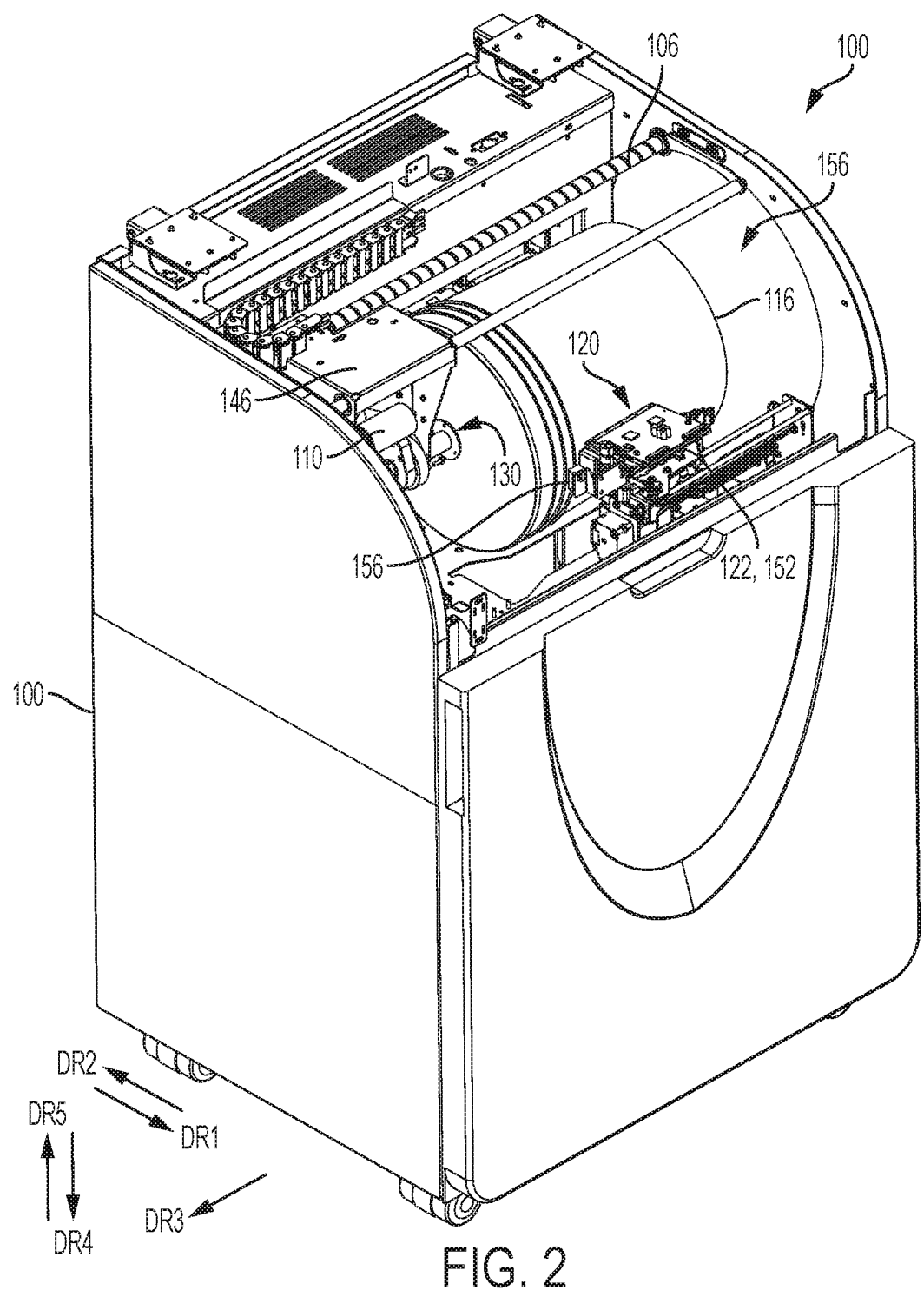
FIG. 2 is a front perspective view of an embodiment of a printer system disclosed herein.
Figure 3:
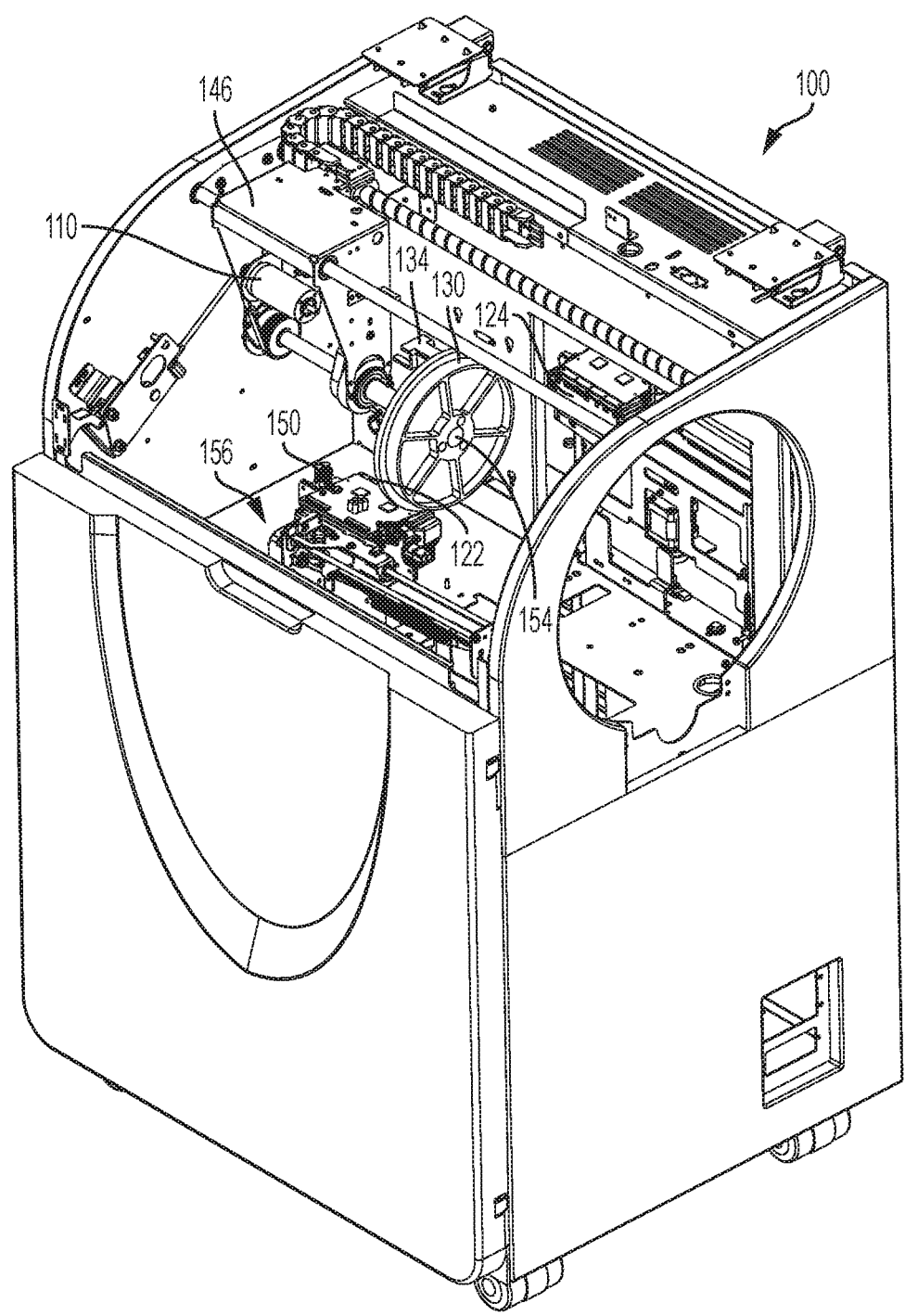
FIG. 3 is a front perspective view of an embodiment of a printer system disclosed herein without a conical object therein.
Figure 4:
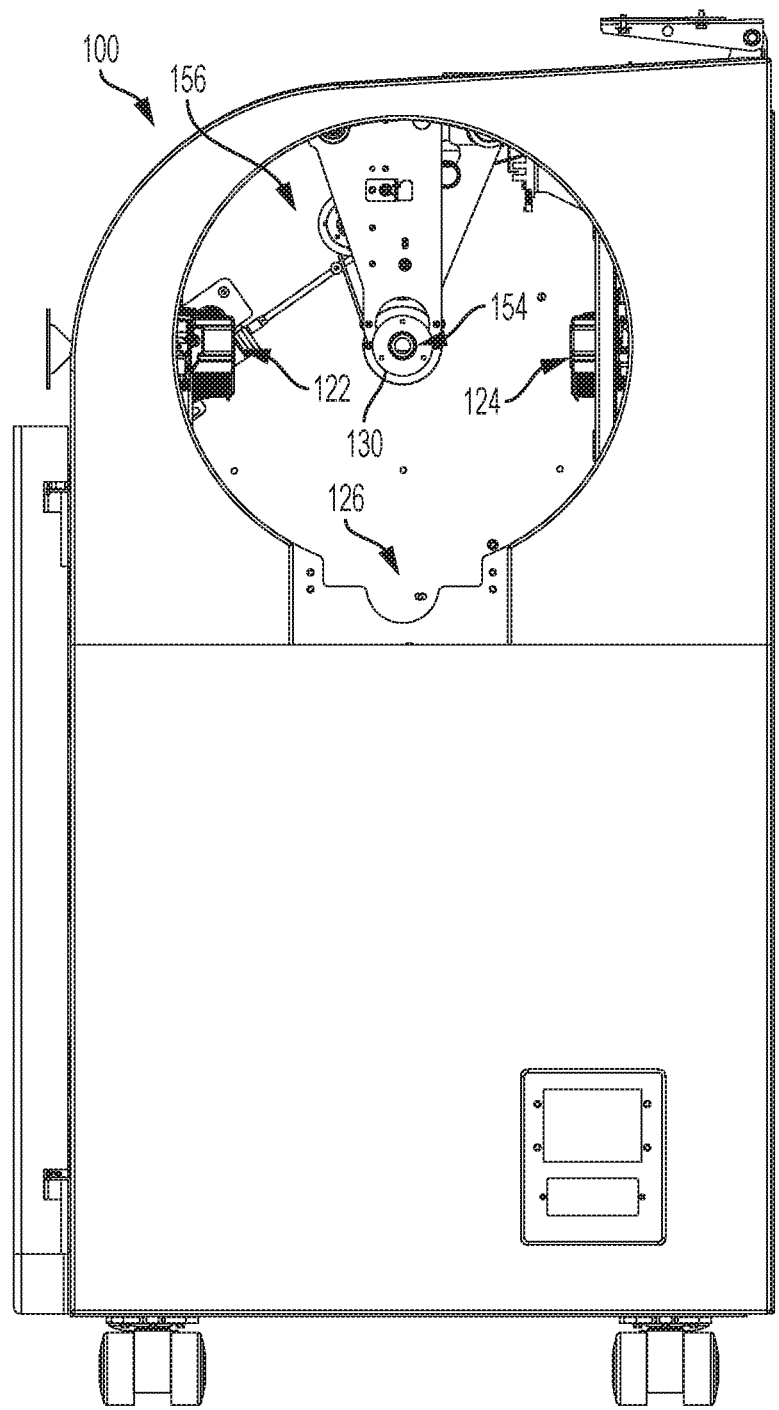
FIG. 4 is a right-side elevational view of an embodiment of a printer system disclosed herein without a conical object.
Figure 5:
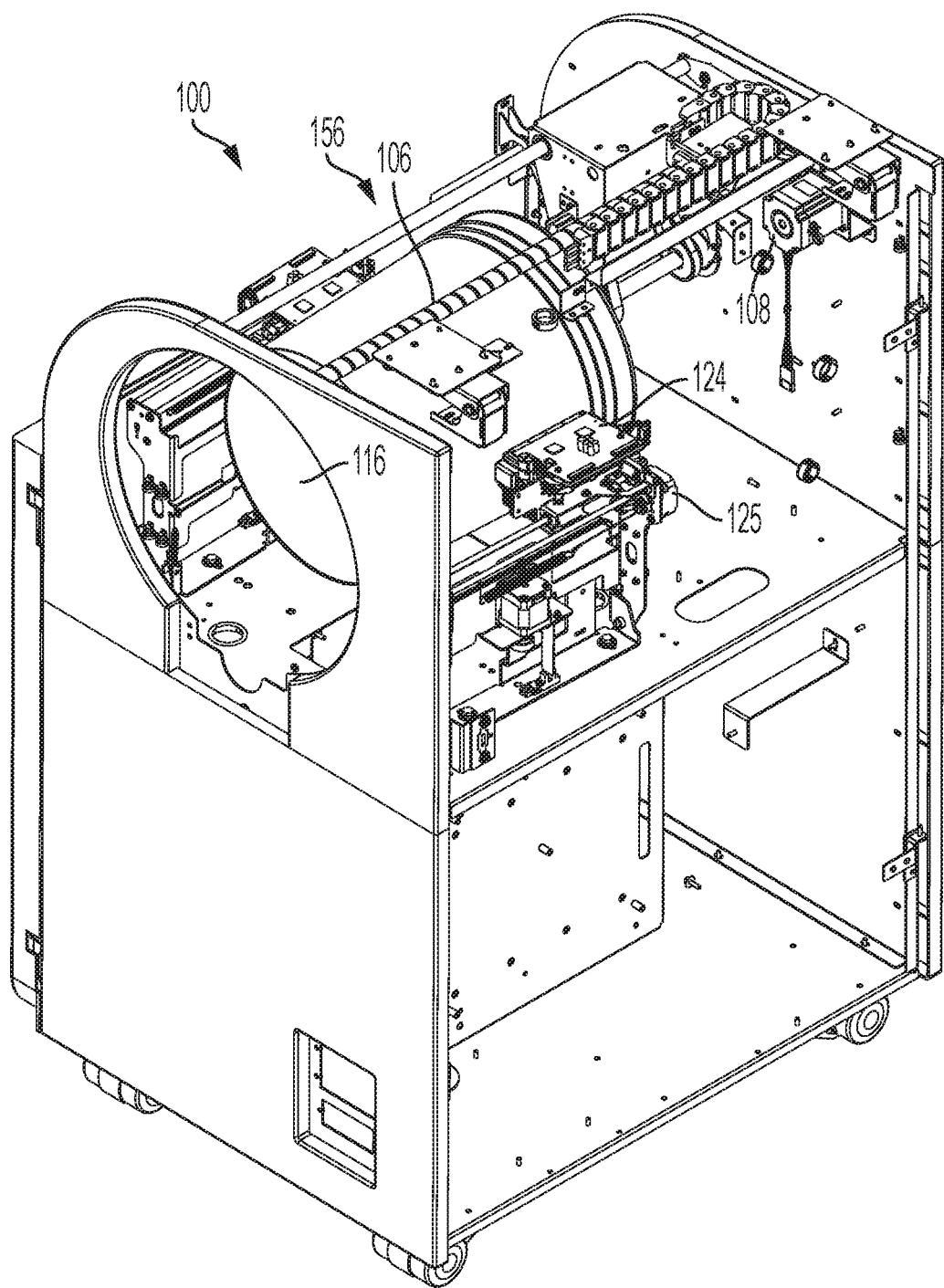
FIG. 5 is a rear perspective view of an embodiment of a printer system disclosed herein.
Figure 6:
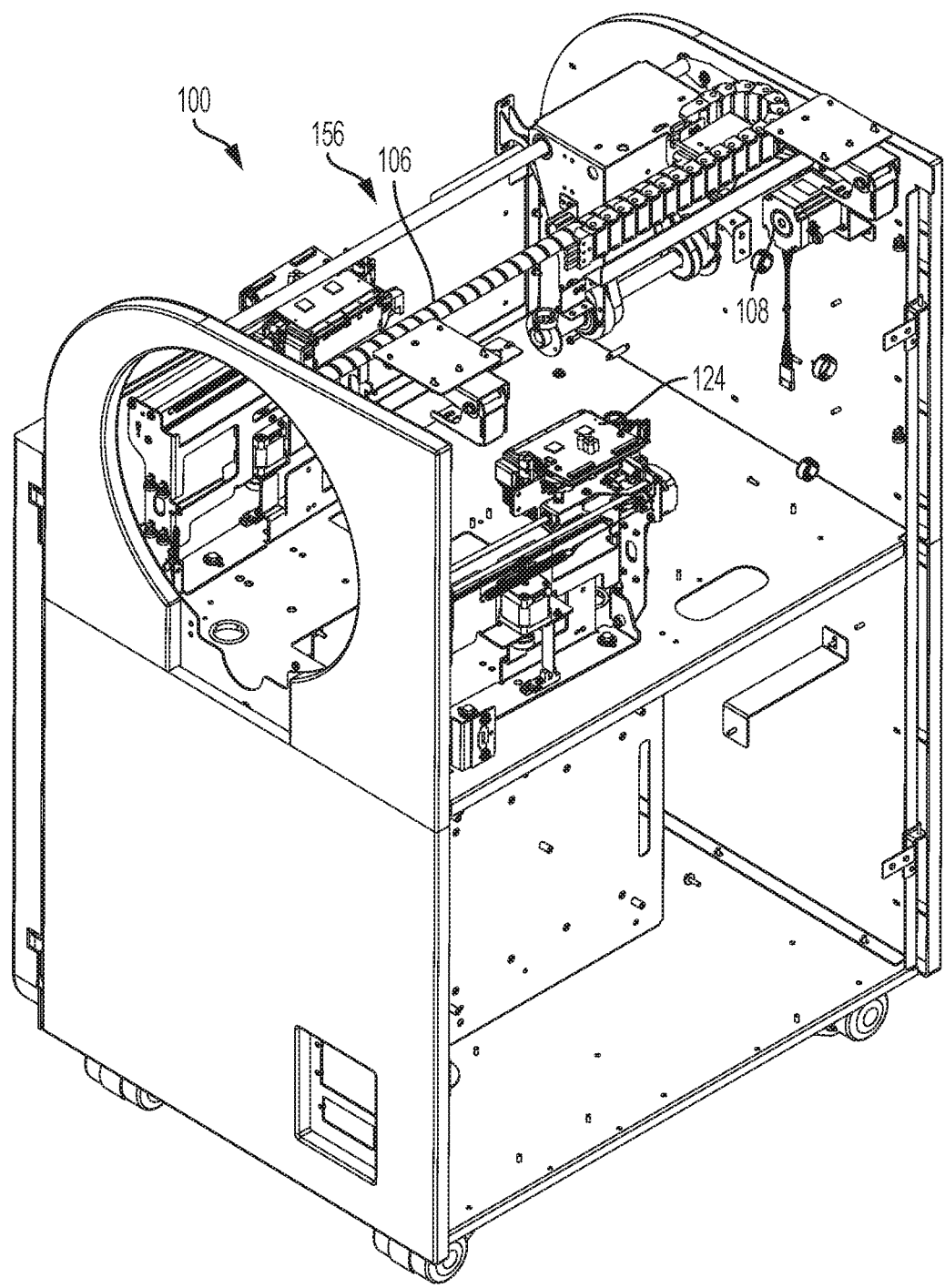
FIG. 6 is a rear perspective view of an embodiment of a printer system disclosed herein without a conical object.
Figure 7:
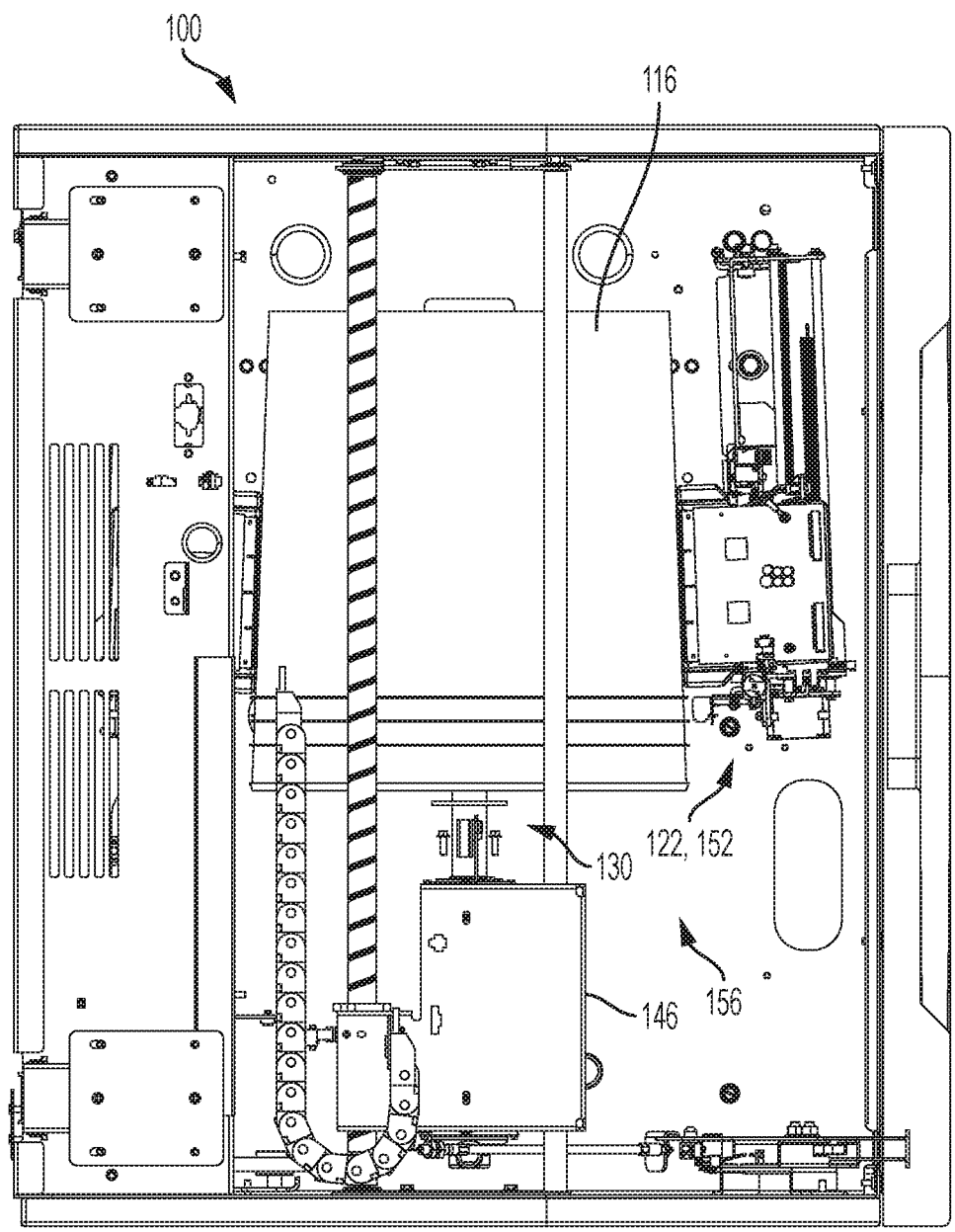
FIG. 7 is a top plan view of an embodiment of a printer system disclosed herein.
Figure 8:
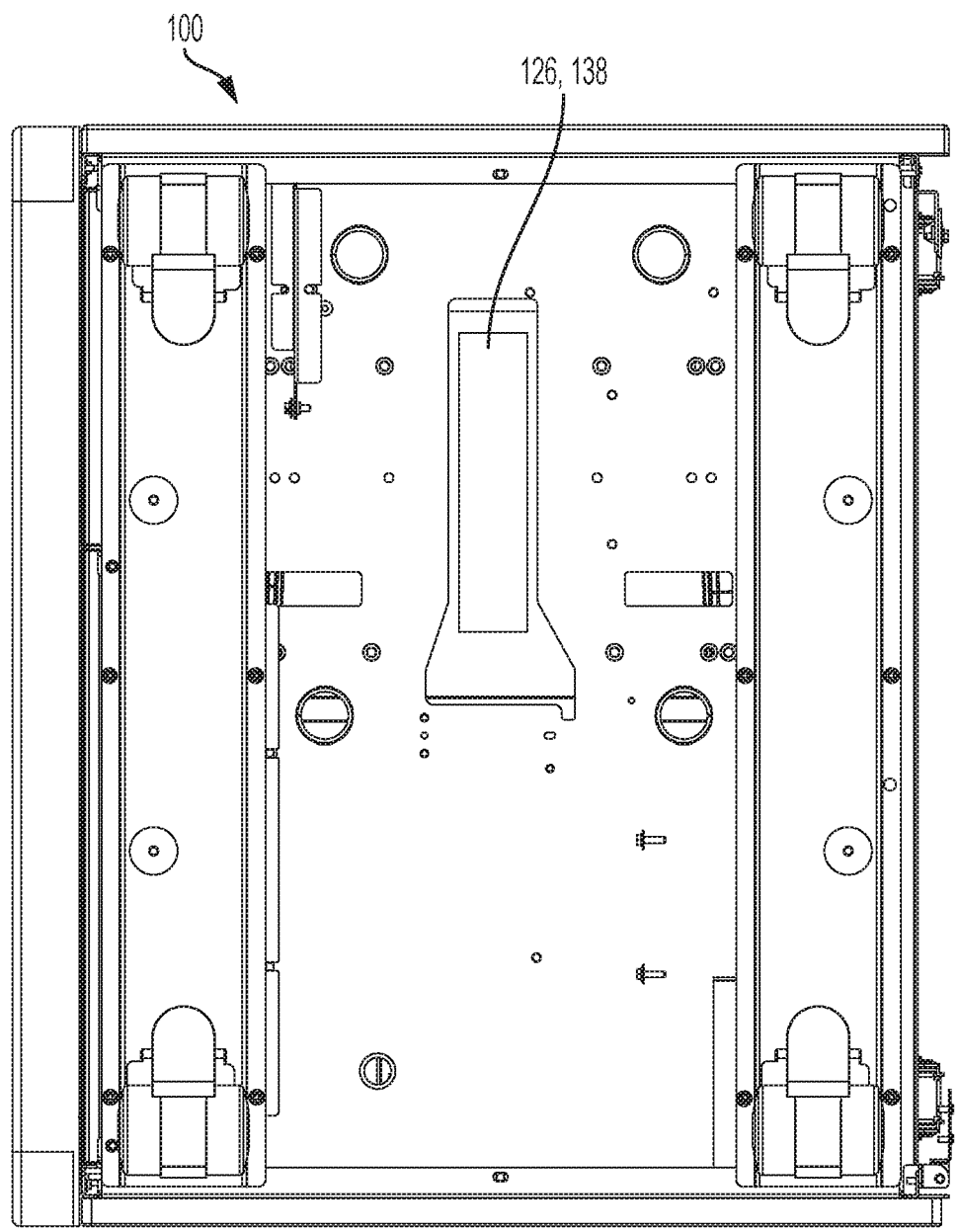
FIG. 8 is a bottom plan view of an embodiment of a printer system disclosed herein.
Figure 9:
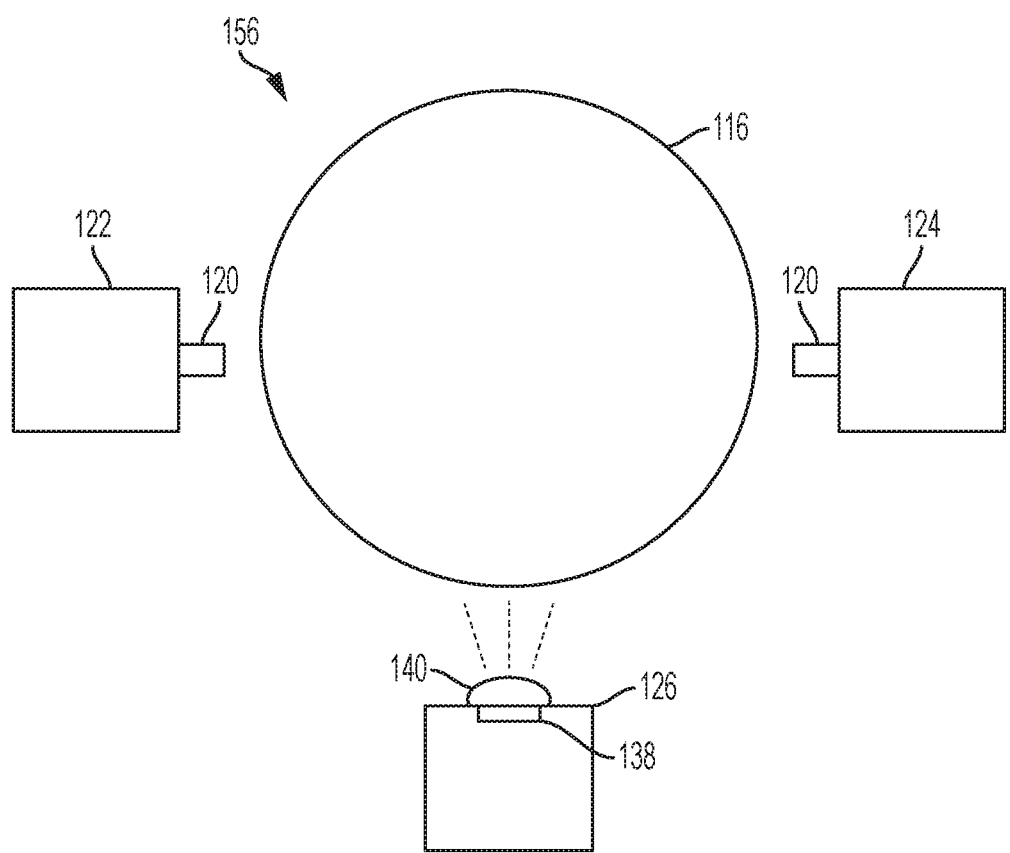
FIG. 9 is a schematic view of a portion of an embodiment of a printer system disclosed herein including a plurality of printheads and curing device arranged about a conical object.
Figure 10:
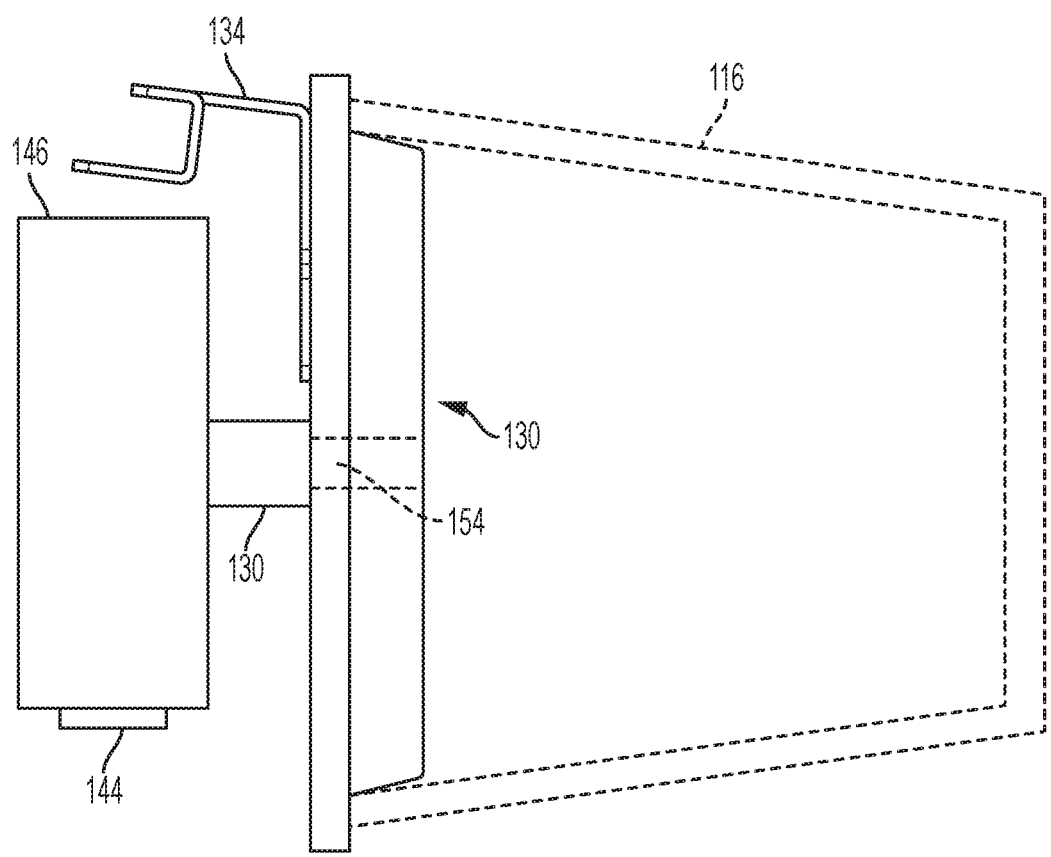
FIG. 10 is a schematic view of a spindle of an embodiment of a printer system disclosed herein having a conical object arranged thereon and depicted in broken lines.
Figure 11:
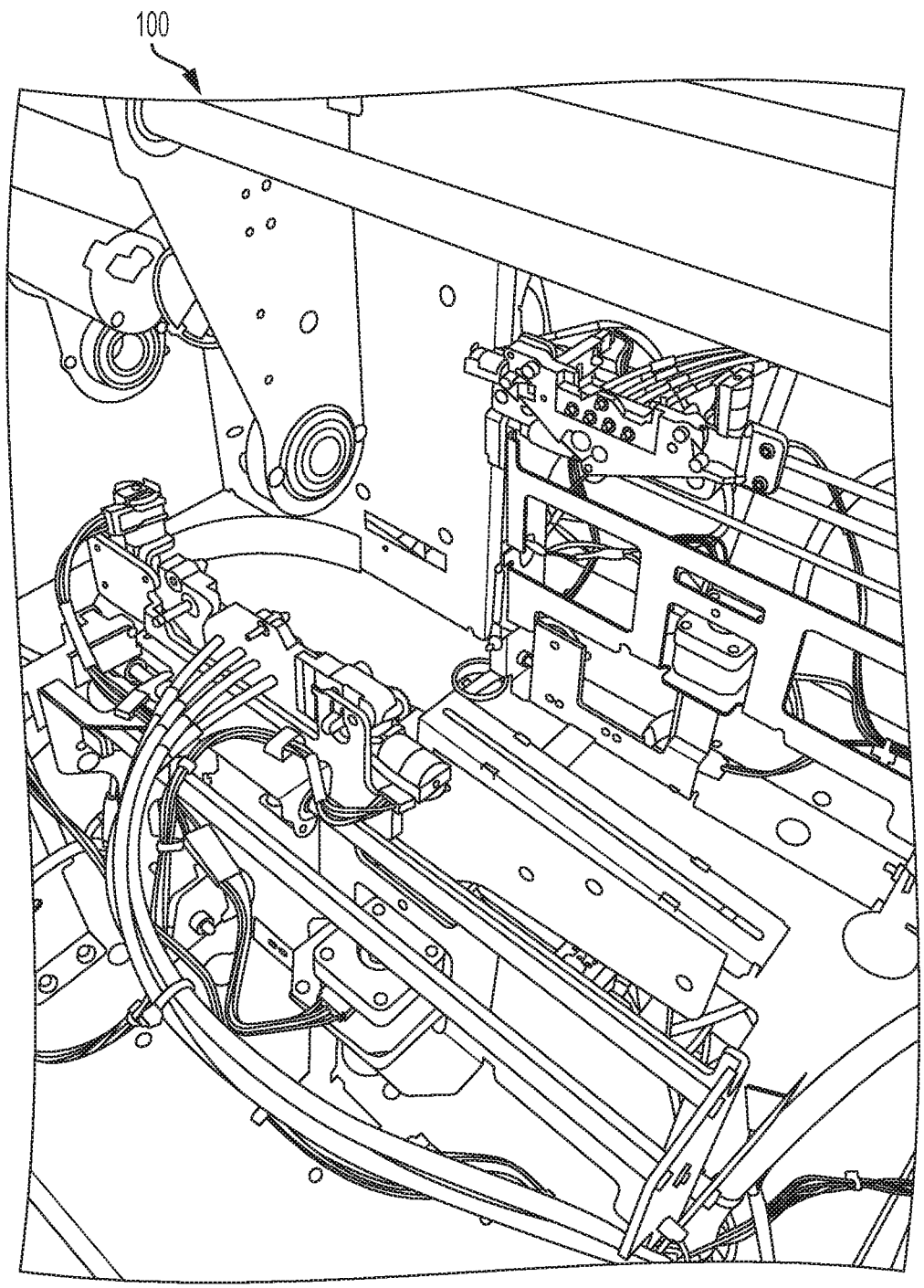
FIG. 11 is a front perspective view of the various internal mechanisms of an embodiment of a printer system disclosed herein including oppositely disposed printhead arrangements.
Figure 12:
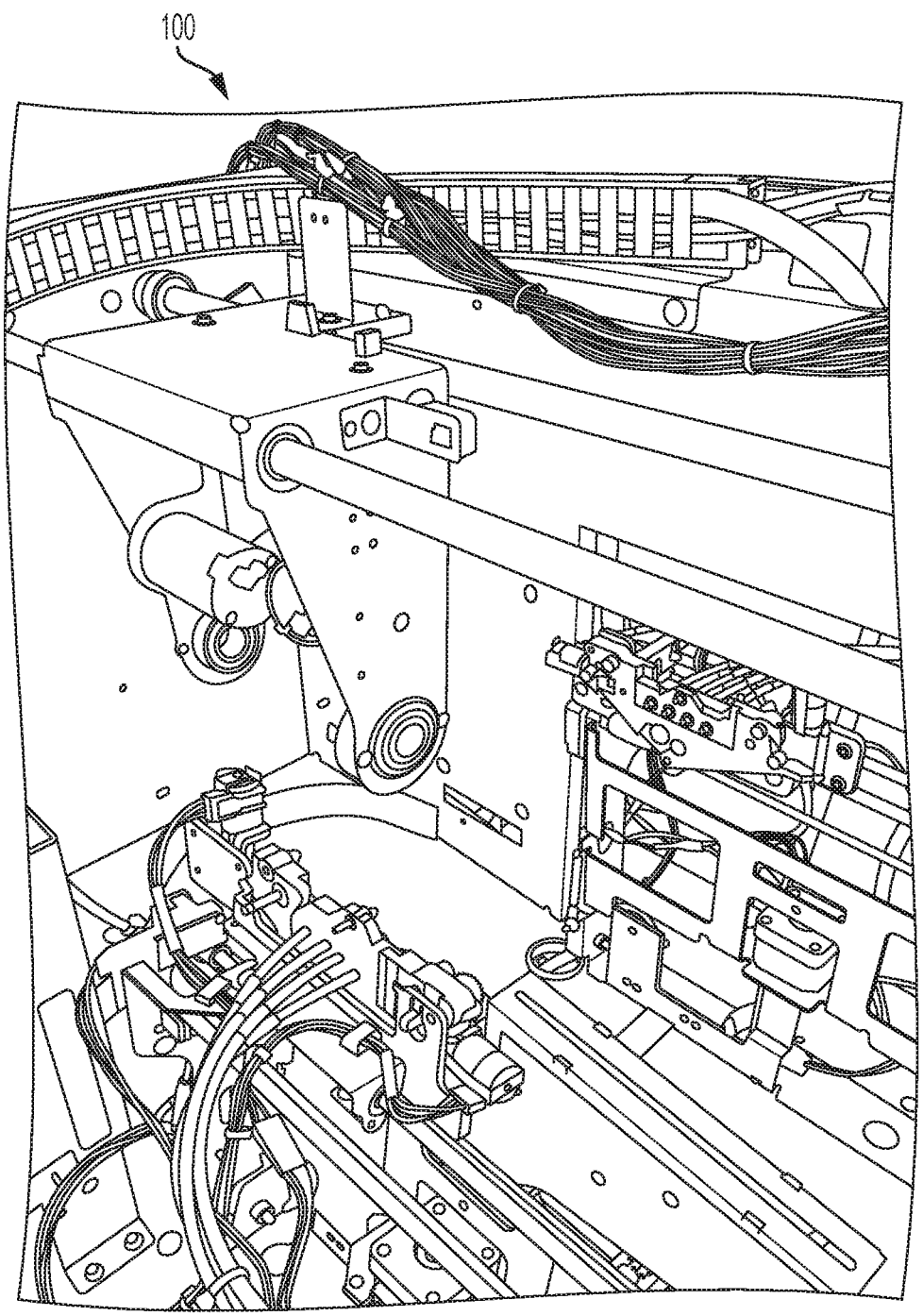
FIG. 12 is a front perspective view of the various internal mechanisms of an embodiment of a printer system disclosed herein including oppositely disposed printhead arrangements.
Figure 13:
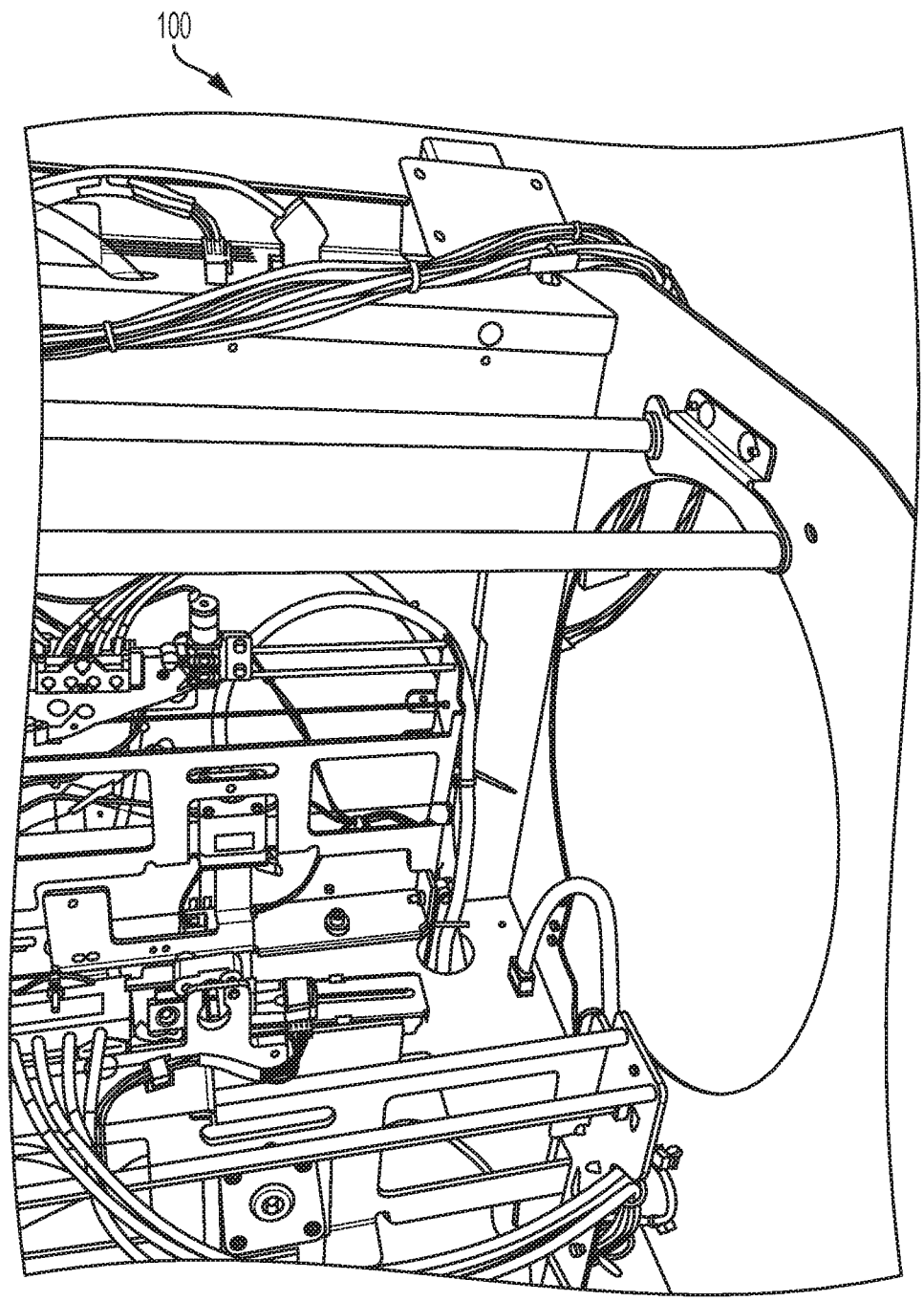
FIG. 13 is a front perspective view of the various internal mechanisms of an embodiment of a printer system disclosed herein including an opening for insertion of an object to be printed upon.
Figure 14:
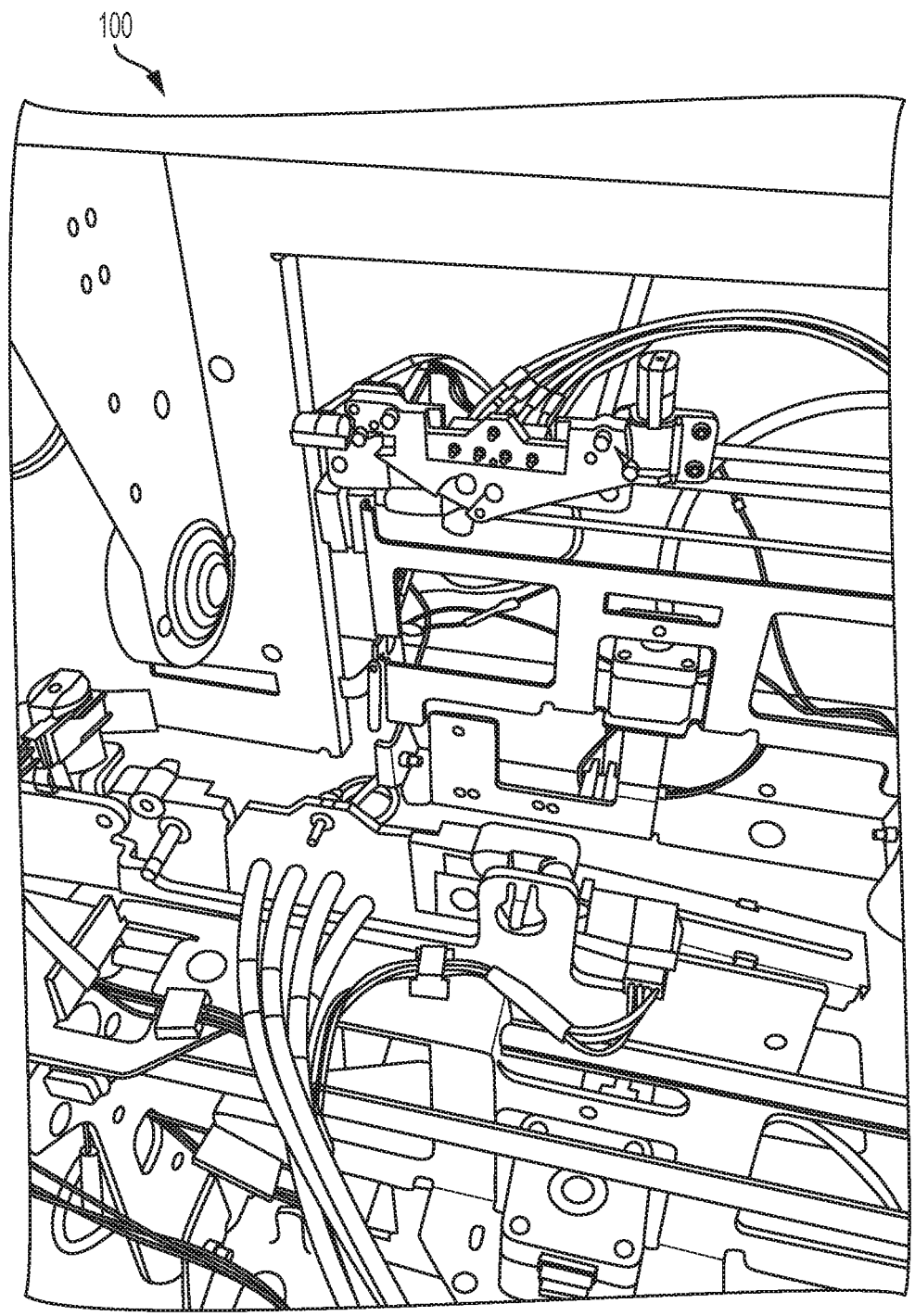
FIG. 14 is a front perspective view of the various internal mechanisms of an embodiment of a printer system disclosed herein including oppositely disposed printhead arrangements.
Figure 15:
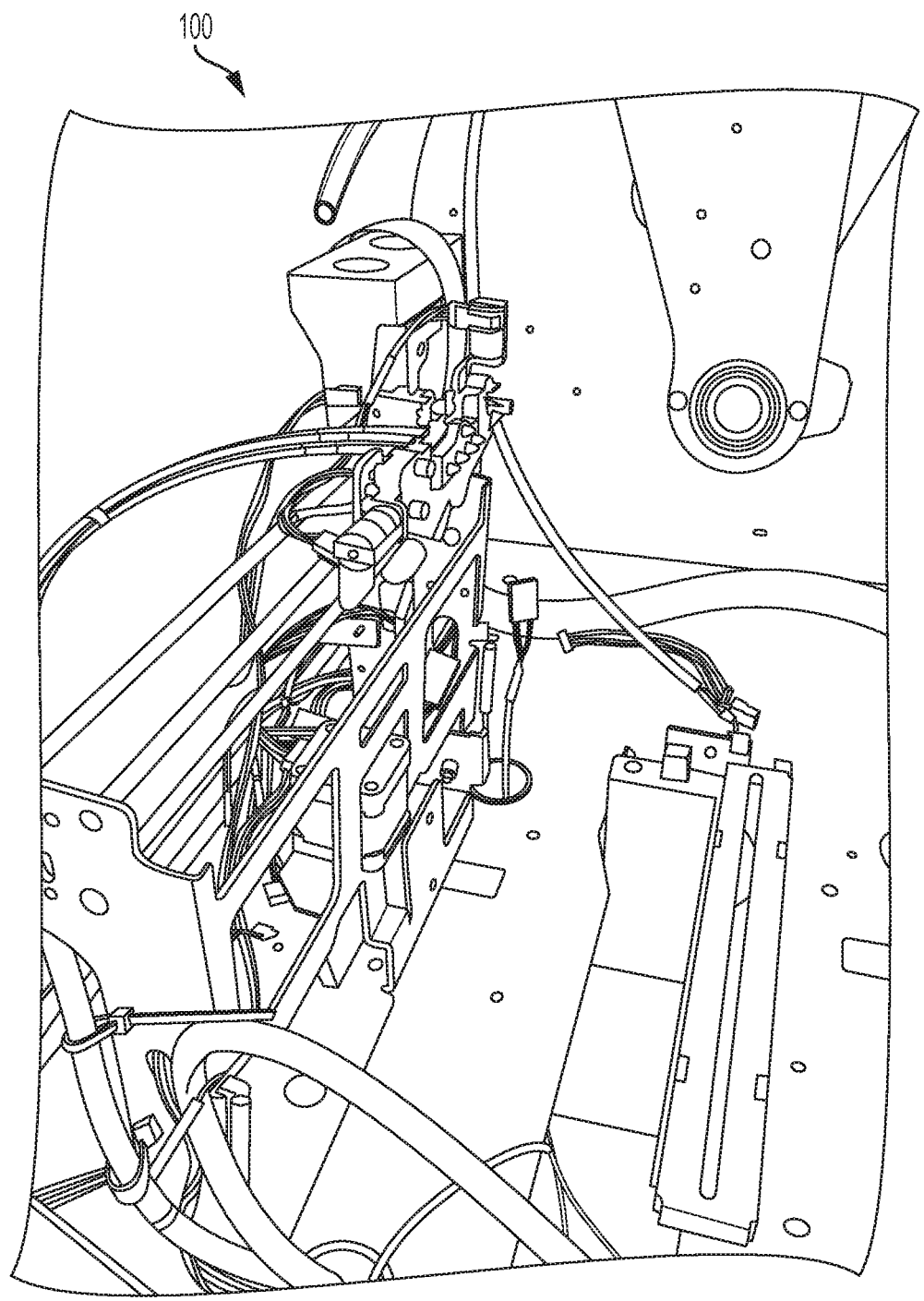
FIG. 15 is a side perspective view of the various internal mechanisms of an embodiment of a printer system disclosed herein including a printhead.
Figure 16:
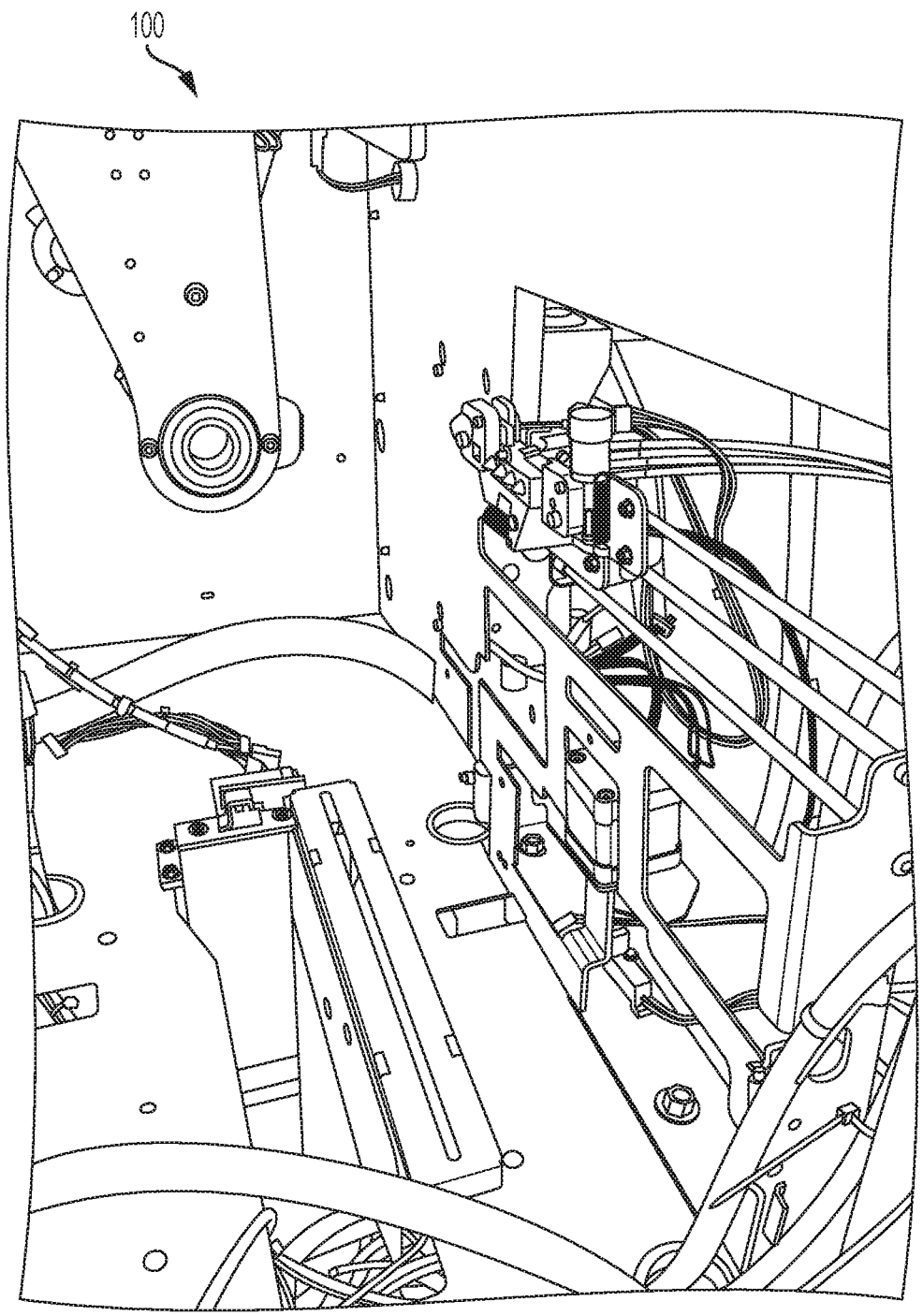
FIG. 16 is a side perspective view of the various internal mechanisms of an embodiment of a printer system disclosed herein including a printhead oppositely disposed from the printhead depicted in FIG. 15.
Figure 17:
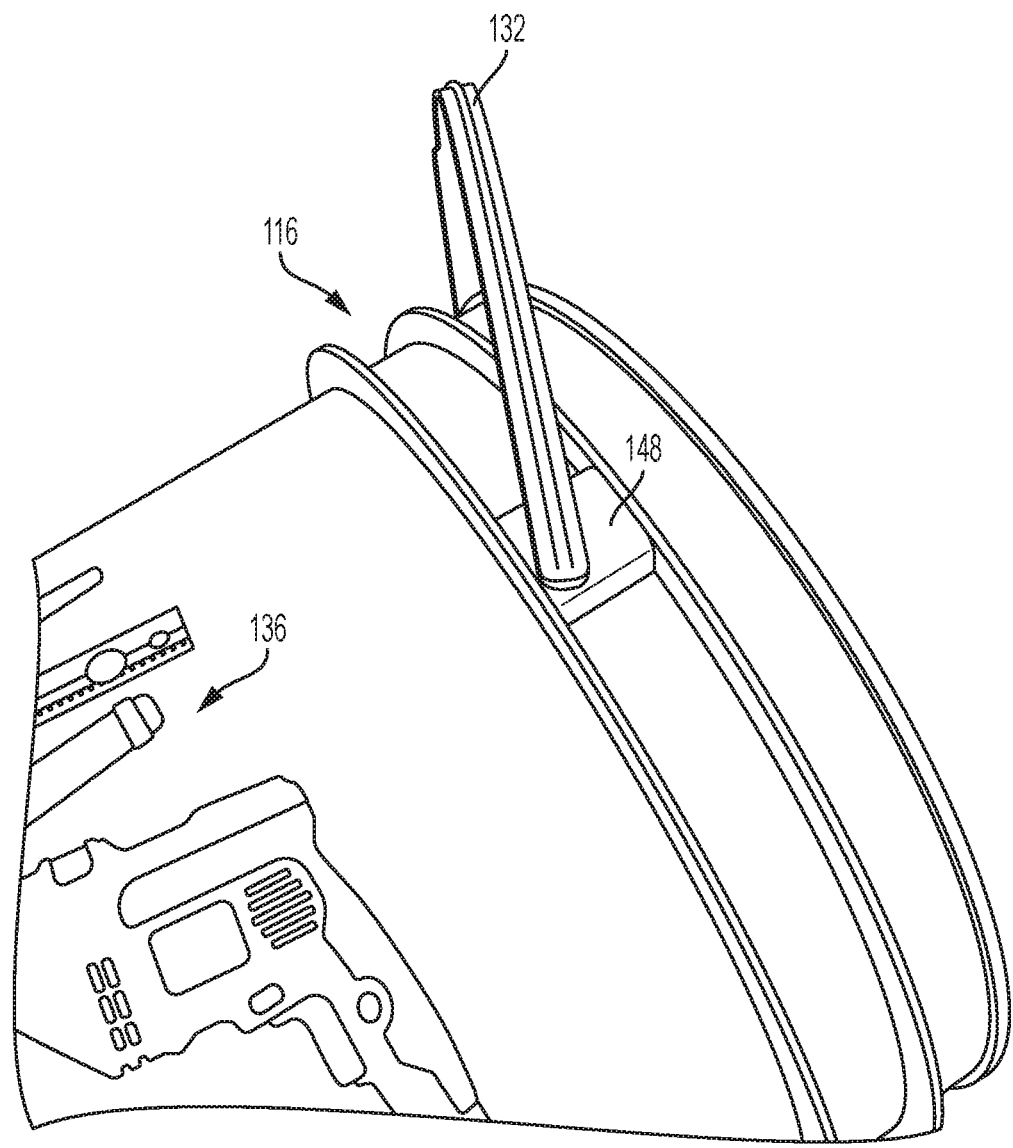
FIG. 17 is a side perspective view of a conical object used with an embodiment of a printer system disclosed herein.
Figure 18:
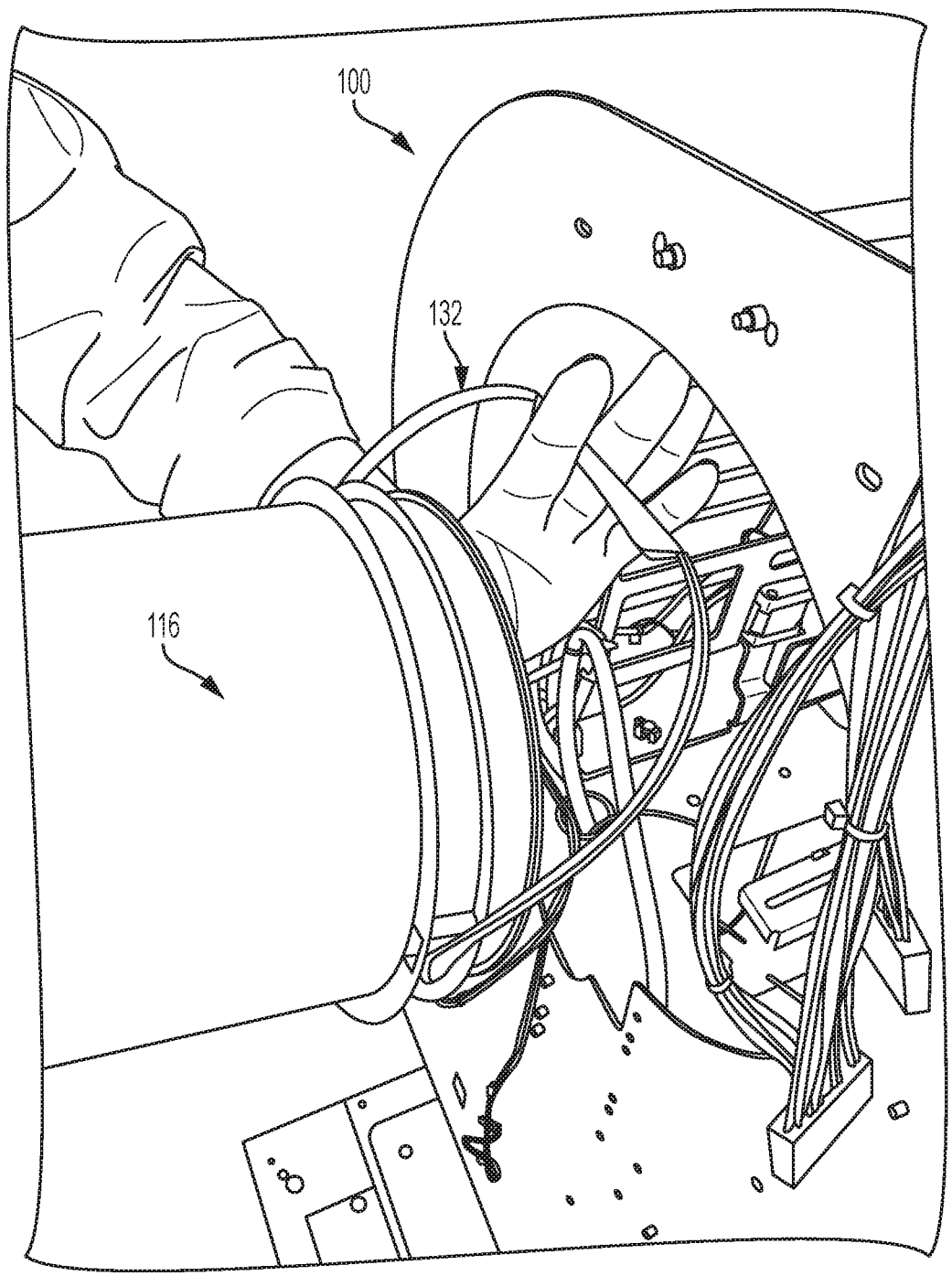
FIG. 18 is a side perspective view of a conical object used with an embodiment of a printer system disclosed herein wherein the conical object is being inserted through the printer system opening; and, FIG. 19 is front perspective view of an embodiment of a spindle with a bracket secured thereon which is used with an embodiment of a printer system disclosed herein.
Figure 19:
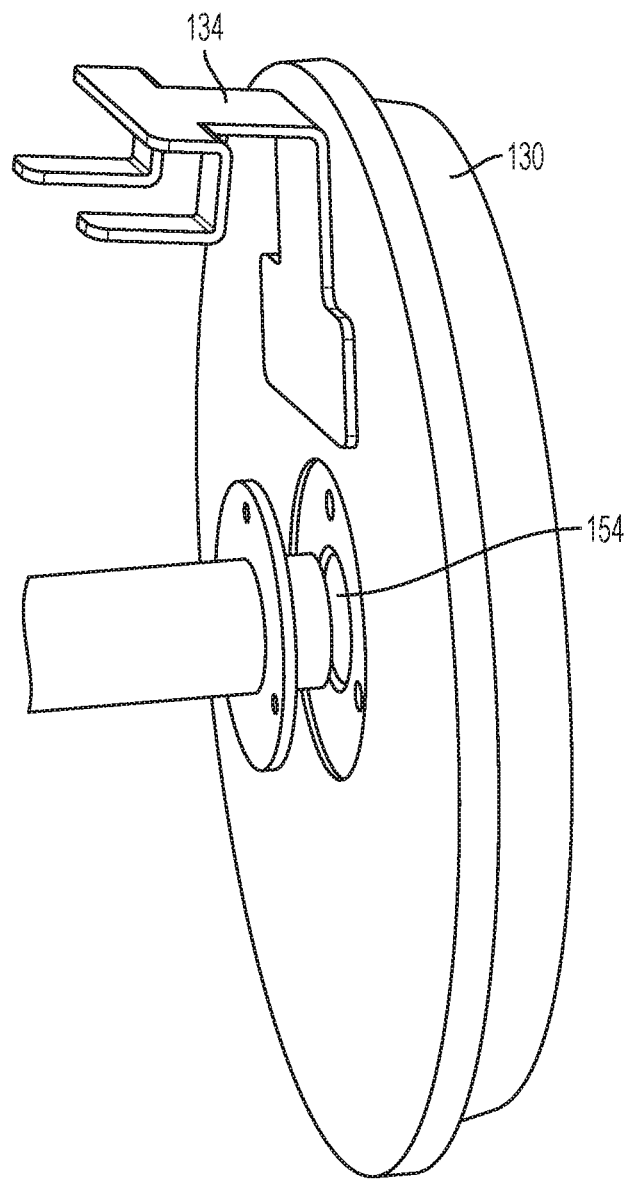

At the outset, it should be appreciated that like drawing numbers on different drawing views identify identical, or functionally similar, structural elements of the embodiments set forth herein. Furthermore, it is understood that these embodiments are not limited to the particular methodologies, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, "full width", e.g., "full width array sensor" and "full width printhead array", is intended to be broadly construed as any structure that covers a significant width of the substrate. For example, in some embodiments, the length of a full width array sensor is approximately half of the width of the substrate which it inspects.

Furthermore, the words "printer," "printer system", "printing system", "printer device" and "printing device" as used herein encompass any apparatus, such as a digital copier, bookmaking machine, facsimile machine, multi-function machine, etc. which performs a print outputting function for any purpose. Additionally, as used herein, "web", "substrate", "printable substrate" refer to, for example, paper, transparencies, parchment, film, fabric, plastic, photo-finishing papers or other coated or non-coated substrate media in the form of a web upon which information or markings can be visualized and/or reproduced, while a "thermoformable substrate" is intended to mean any substrate capable of being thermoformed after printing, i.e., capable of being shaped by the use of heat and pressure. As used herein, the term 'average' shall be construed broadly to include any calculation in which a result datum or decision is obtained based on a plurality of input data, which can include but is not limited to, weighted averages, yes or no decisions based on rolling inputs, etc.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Although any methods, devices or materials similar or equivalent to those described herein can be used in the practice or testing of these embodiments, some embodiments of methods, devices, and materials are now described.

The following explanation is a summary of the various concepts contained herein. The present system and apparatus 100 include housing 104, rod 106 arranged to be driven by first motor 108, object rotating subsystem 114, conical object 116, vacuum source 118, a plurality of printheads 120, e.g., printheads 122 and 124, curing lamp 126 positioned offset by ninety degrees from each printhead when viewed relative to object 116, and controller 128. Object rotating subsystem includes spindle 130 configured for reciprocal movement in the direction DR1 and DR2, second motor 110 operatively connected to spindle 130 to rotate spindle 130 when engaged with an object, e.g., conical object 116. It should be appreciated that spindle 130 rotates in a first rotational direction and a second rotational direction opposite the first rotational direction. For example, the first rotational direction may be clockwise rotation while the second rotational direction may be counter-clockwise rotation. Vacuum source 118 is operatively connected to spindle 130, and each of printheads 122 and 124 is operatively arranged to dispense a marking material onto object 116. Each of printheads 122 and 124 is connected with a third motor 123 and a fourth motor 125, respectively, which displace printheads 122 and 124 in a first direction DR1 and/or second direction DR2, respectively. Additionally, a protrusion sensor 150 is operatively arranged on print head carrier 152 and arranged to register a first location of protrusion 148.

Prior to operation, an object, e.g., cylindrical or conical bucket 116, is placed in close proximity to spindle 130. If the object includes additional components, e.g., handle 132, such components must be secured to prevent damage to or misprinting by system 100. For example, bracket 134 is included in the embodiments depicted in the figures. As bucket 116 is positioned proximate spindle 130, handle 132 is secured by bracket 134 thereby preventing movement of handle 132 during operation of system 100. Vacuum source 118, which is operatively connected to spindle 130, is activated and a negative pressure is created at opening 154 of spindle 130. The negative pressure engages conical object 116 and secures conical object 116 to spindle 130. Spindle 130 is actuated in first direction DR1 and second direction DR2 moving object 116 from outside housing 104 to inside housing 104.

A desired image, e.g., image 136, is processed via a system controller or other computer system into either a continuous helical image, or a series of step-wise portions of an image. When the desired image is a continuous helical image, the plurality of printheads traverse the length of conical object 116 in a continuous motion from one end of object 116 to the opposite end as object 116 rotates in apparatus 100. When the desired image is partitioned into a series of step-wise portions of the image, the plurality of printheads will traverse the length of object 116 in a series of step-wise motions proportional to the width of each partitioned image. Within that series of step-wise motions, the printheads will print in incremental steps, e.g., each step including a printed portion equivalent to substantially the length of the printhead plus and additional amount, such as 7 microns, introduced by a small movement of the printhead. It should be appreciated that relative movement between the object and the printheads may be introduced by at least one of the following means: linear movement of the spindle; and, linear movement of the printhead.

The plurality of printheads are arranged in a lateral direction, e.g., a direction orthogonal to the surface of the conical object, i.e., direction DR3. In some embodiments, system 100 comprises eight (8) printheads where each printhead is arranged to dispense a material, e.g., a marking material, a primer material, an over-coating material, etc., onto conical object 116. The materials dispensed from each printhead may be the same or different thereby permitting a variety of printed images, e.g., multi-color images, images including an overcoat layer, etc. Curing lamp 126 is beneath conical object 116, i.e., in direction DR4. In some embodiments, curing lamp 126 comprises a plurality of Ultra Violet (UV) Light Emitting Diodes (LEDs) arranged as linear array 138 and cylindrical lens 140 positioned to focus the emitted UV light into a line on object 116. During the printing process and as conical object 116, e.g., a bucket, rotates within apparatus 100, the intensity of light emitted from curing lamp 126 is increased as the number of rotations of conical object 116 increases to cure image 136 as the diameter of conical object 116 decreases. It should be appreciated that the printheads and curing lamp may be arranged in any orientation, although it is preferred to maintain the printheads and curing lamp orthogonally relative to each other. It should be further appreciated that other orientations are also possible provided that light emitting from the curing lamp does not project to the printheads, e.g., the printheads and curing lamp may be offset by one hundred twenty degrees (120°) relative to each other. The aforementioned orientation minimizes the amount of space used by the printheads and curing lamp and is used to prevent curing of dispensed materials within the printheads thereby extending the useful life of the printheads. Moreover, the curing lamp may also be positioned above the object, rather than below. Furthermore, the curing lamp may be placed adjacent a side elevational position of the object, as the orientation of the curing lamp relative to the printheads is controlled, i.e., illumination emitted by the curing lamp is prevented from reaching the printheads.

It should be further appreciated that curing lamp 126 may be used to pin or partially cure the printed image during each dispensing operation. Thus, in these embodiments, curing lamp 126 partially cures the printed image during each rotation and fully cures the printed image after completing the dispensing of material from the printheads. Moreover, curing lamp 126 may move relative to housing 104 or alternatively, object 116 may move relative to curing lamp 126. Still further, the printheads may be manually or automatically aligned relative to the orientation of the surfaces that receive the printed image. For example, the printheads may be oriented in an angular fashion to align with the frustoconical outer surface of a bucket. For automatic alignment, a least one proximity sensor and drive motor is necessary to detect the location of the surface and to move the printhead accordingly.

Emitted light feedback sensor 144 is operatively arranged on spindle carrier 146 for spindle 130 of apparatus 100 and is positioned in direction DR5 with respect to curing lamp 126. Emitted light feedback sensor 144 is arranged to measure an initial intensity and a final intensity of emitted light received from curing lamp 126, e.g., UV light. Thus, as spindle carrier 146 moves over curing lamp 126, in the direction DR2 when loading an object and in direction DR1 when dispensing the object after printing, sensor 144 obtains an initial intensity and a final intensity, respectively. If at any time during the printing process, the emitted light intensity measured at feedback sensor 144 drops below a predetermined threshold, e.g. an amount sufficient to ensure full curing of the printed material, the curing lamp controller triggers an alarm that indicates the printed material may not be fully cured, and apparatus 100 ceases operation until such time as curing lamp 126 can be fixed or replaced. A drop below the threshold, or a relative difference between the initial and final intensities, may also indicate burned out LEDs in array 138 contained in curing lamp 126.

In some embodiments, conical object 116 is a bucket or object including a handle or other moveable component, e.g., a lid. In these embodiments, printing system 100 further comprises bracket 134 fixedly secured on carrier 146 and operatively arranged to engage with handle 132 of bucket 116. As bucket 116 spins during the printing process, bracket 134 engages handle 132 and prevents it from freely pivoting within printing chamber 156 of housing 104.

In some embodiments, optical sensor 150 is provided for the express purpose of locating a protrusion, e.g., protrusion 148, on the external surface of conical object 116. Protrusion 148 establishes an orientation of object 116 such that in some circumstances it is desirable to align the printed image with respect to protrusion 148. Thus, the printed image may be aligned with what is considered the "front" of object 116. For example, if conical object 116 is a five (5) gallon bucket, it is desirable to orient the image on the external surface of the bucket with respect to the position of the bucket handle. The printing process begins by spinning bucket 116 about a longitudinal axis through the partial through-bore of the bucket in a first rotational direction. While bucket 116 spins, optical sensor 150 locates one of the two protrusions 148 within which bucket handle 132 is secured. Once optical sensor 150 locates one of protrusions 148, the bucket's orientation or "front" surface is known and the orientation of the image can then be properly established. In an example, after detection of the protrusion, rotation is stopped, and then bucket 116 is rotated in a second direction approximately 45 degrees so that when the printing process begins the image is properly oriented with respect to handle 132 of bucket 116. It should be appreciated that although sensor 150 is described as an optical sensor, other types of sensors may also be used, e.g., high frequency proximity sensors, ultrasonic sensors, contact sensor, etc.

It should be appreciated that although the aforementioned embodiments are described in the context of printing UV curable inks, other materials may also be printed, e.g., waxes and solid inks. In those embodiments, a different curing lamp or no curing lamp may be needed. Moreover, the present system is fully configurable in that any form of print recipe can be performed. For example, a recipe may include the initial deposit of a primer layer followed by a subsequent deposit of an image and further followed by a final deposit of an overcoat layer. Still further, the present system can accommodate irregularly shaped surfaces, e.g., a surface including a protrusion. In some embodiments, the printheads included in the present system can print on protrusions extending up to seven (7) millimeters from the surface. Thus, the present system does not need to alter the distance between the printheads and the surface.

The present disclosure sets forth an apparatus for printing onto buckets and other large round conical or frustoconical containers. A bucket or other object is held onto a mandrel or spindle with a vacuum and is spun along its axis. At least one or more printheads, e.g., one inboard and one outboard facing towards each other on opposite sides of the bucket, print up to 4 colors each. A curing lamp is positioned below the bucket and may act to pin and/or cure the ink after one printhead dispenses prior to the next printhead dispensing. Printheads can index in the axial direction to gain effective print resolution. The mandrel or spindle can index in the axial location to print larger images. This arrangement allows for printing on containers with a large rim such as a typical plastic bucket and does so without interference of a shuttling printhead. A benefit of the present system includes decreased run cost and increased throughput versus offset printing or pre-printed and then applied labels. The present system enables improved capability over other rotary direct to object printers in printing large-rimmed containers.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for printing images on an object, the system comprising:
    a housing;
    a rod driven by a first motor;
    an object rotating subsystem positioned about the rod and arranged for reciprocal movement, the object rotating subsystem comprising:
        a spindle; and
        a second motor operatively connected to the spindle and configured to rotate the object in a first rotational direction and/or a second rotational direction;
    a vacuum source operatively connected to the spindle;
    a plurality of printheads;
    a curing lamp;
    a feedback sensor, fixedly secured to the spindle and arranged to register a first light intensity from the curing lamp at a start of the printing process; and
    a controller operatively connected to the plurality of printheads, the first motor, the second motor, the curing lamp, the controller configured to operate the first motor, the second motor, the plurality of printheads, and the curing lamp, wherein the plurality of printheads are configured to eject a first marking material onto the object and the second motor rotates the object in the first and/or second rotational direction.

2. The system of claim 1 further comprising:
    an optical sensor, fixedly secured to the plurality of printheads or the spindle, the optical sensor operatively arranged to register a location of a first protrusion on a surface of the object.

3. The system of claim 2 wherein the plurality of printheads are connected to a third motor, the third motor operatively arranged to displace the printheads in a first lateral direction and a second lateral direction, where the first and second lateral directions are substantially parallel to the rod.

4. The system of claim 3 wherein the third motor is operatively arranged to displace the plurality of printheads in the first and/or second lateral directions in step-wise movements that begin at the registered location of the first protrusion.

5. The system of claim 1 wherein the first motor is further configured to rotate the rod in a first rotational direction and a second rotational direction to displace the object rotating subsystem in a first lateral direction and a second lateral direction, respectively, wherein the first lateral direction and the second lateral direction are substantially parallel with the rod.

6. The system of claim 1 further comprising a bracket, fixedly secured to the spindle and operatively arranged to engage a moveable component of the object.

7. The system of claim 6 wherein the moveable component is a handle.

8. The system of claim 1 wherein the plurality of printheads are positioned at a first distance relative to the surface of the object in a third lateral direction, where the third lateral direction is substantially orthogonal to the surface of the object.

9. The system of claim 1 wherein the curing lamp is positioned at a first distance relative to the surface of the object in a third lateral direction, where the third lateral direction is substantially orthogonal to the surface of the object.

10. The system of claim 1 wherein the curing lamp further comprises a plurality of light-emitting diodes.

11. The system of claim 10 wherein the plurality of light emitting diodes are configured to emit ultra-violet light.

12. The system of claim 1 wherein the feedback sensor is arranged to register a second light intensity from the curing lamp at a completion of the printing process.

13. The system of claim 1 wherein the object is a conical object.

14. The system of claim 1 wherein the object is a bucket.

15. A method of printing an image onto an object comprising:
    creating a negative pressure with a vacuum source operatively connected to a spindle;

securing the object to a carrier, operatively arranged to rotate in a first rotational direction and a second rotational direction;
rotating the object with a first motor in the first rotational direction a first rotational distance;
sensing with at least one optical sensor a location of a first protrusion on an external surface of the object while the object is rotating;
stopping the rotation of the object in the first rotational direction;
rotating the object with the first motor in the second direction a second rotational distance, the second rotational distance is based on the location of the first protrusion; displacing a printhead carrier with a second motor to a first position determined by the location of the first protrusion; and
printing an image onto the external surface of the object with a plurality of printheads arranged on the printhead carrier.

16. The method of printing an image onto an object of claim 15 further comprising:
splitting an image into a series of partitioned images; and
displacing the printhead carrier in a series of step-wise movements where each step-wise motion prints each of the partitioned images respectively, until the entire image is printed on the external surface of the object.

* * * * *